(12) United States Patent
Xie et al.

(10) Patent No.: US 8,570,782 B2
(45) Date of Patent: Oct. 29, 2013

(54) POWER SUPPLY CIRCUIT

(75) Inventors: Ling-Yu Xie, Shenzhen (CN); Xing-Ping Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 315 days.

(21) Appl. No.: 13/096,607

(22) Filed: Apr. 28, 2011

(65) Prior Publication Data

US 2012/0099355 A1    Apr. 26, 2012

(30) Foreign Application Priority Data

Oct. 25, 2010  (CN) .......................... 2010 1 0517925

(51) Int. Cl.
*H02M 1/00*    (2007.01)
(52) U.S. Cl.
USPC .......................................... 363/144; 323/237
(58) Field of Classification Search
USPC ......... 323/207, 209, 211, 215, 216, 239, 258, 323/340; 363/16–17, 21, 7, 37, 41, 56, 3, 363/56.11, 65, 97, 98; 361/90, 91.01, 111, 361/42; 315/291, 307, 362
See application file for complete search history.

(56) References Cited

U.S. PATENT DOCUMENTS

| | | | | |
|---|---|---|---|---|
| 4,853,608 A | * | 8/1989 | Schrade | 323/258 |
| 5,500,575 A | * | 3/1996 | Ionescu | 315/307 |
| 6,108,226 A | * | 8/2000 | Ghosh et al. | 363/142 |
| 6,621,254 B1 | * | 9/2003 | Williams | 323/239 |

* cited by examiner

*Primary Examiner* — Rajnikant Patel
(74) *Attorney, Agent, or Firm* — Altis & Wispro Law Group, Inc.

(57) ABSTRACT

A power supply circuit includes a voltage regulating circuit, a control circuit, and a switch circuit. The voltage regulating circuit receives an AC voltage signal from a live wire output terminal and converts the AC voltage signal to a control signal. The control circuit receives the control signal and turns on or turns off an electronic connection from the AC voltage signal to the switch circuit according to the control signal. The switch circuit is configured to be powered on and output the AC voltage signal when the electronic connection from the AC voltage signal to the switch circuit is turned on.

15 Claims, 2 Drawing Sheets

POWER SUPPLY CIRCUIT

BACKGROUND

1. Technical Field

The disclosure generally relates to power supply circuits, and especially to a power supply circuit for protecting electronic devices from being damaged when an AC power supply is over voltage or under voltage.

2. Description of Related Art

In alternating current (AC, also ac), the movement of electric charge regularly reverses direction. AC is the form in which electric power is delivered to businesses and residences. The usual waveform of an AC power circuit is a sine wave. In certain applications, different waveforms are used, such as triangular or square waves. Audio and radio signals carried on electrical wires are also examples of alternating current. In these applications, an important goal is often the recovery of information encoded (or modulated) onto the AC signal. A certain electronic devices nowadays do not have the ability to receive an AC voltage. Take 115V and 220VAC voltages as an example, the 115V and 220V AC voltages are variable from 100V to 240V. An over voltage or under voltage may be input in the electronic devices and can damage these electronic devices.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
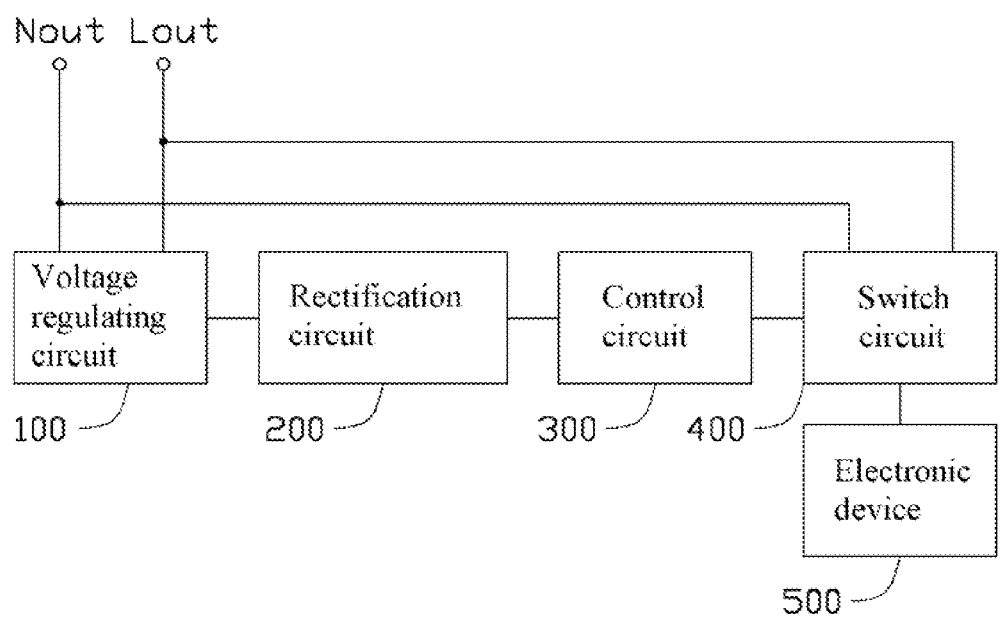
FIG. 1 is a block diagram of an embodiment of a power supply circuit.

Referring to FIG. 1, an embodiment of a power supply circuit, for protecting an electronic device 500 from being damaged when an AC power supply is over voltage or under voltage, includes a voltage regulating circuit 100, a rectification circuit 200, a control circuit 300, and a switch circuit 400. The voltage regulating circuit 100 is configured to receive an AC voltage signal from an AC power supply (not shown) and convert the AC voltage signal to a control signal. The rectification circuit 200 is configured to receive the control signal and convert the control signal to a DC voltage signal. The control circuit 300 is configured to receive the DC voltage signal and turn on or turn off an electronic connection from the AC voltage signal to the switch circuit 400 according to the DC voltage signal. The switch circuit 400 is configured to be powered on and the AC voltage signal is output to the electronic device 500 when the electronic connection from the AC voltage signal to the switch circuit 400 is turned on.

Figure 2:
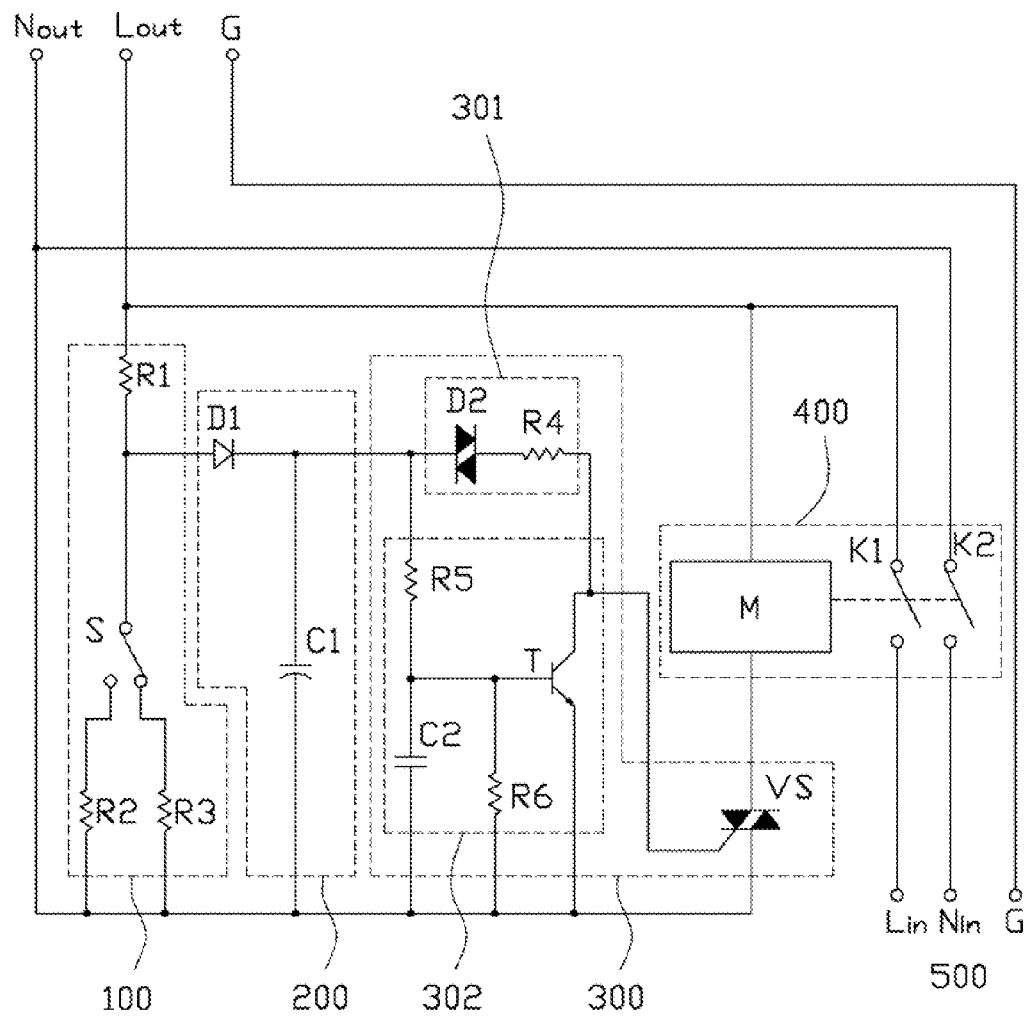
FIG. 2 is a circuit view of an embodiment of the power supply circuit.

Referring to FIG. 2, the voltage regulating circuit 100 includes single-pole double-throw (SPDT) S, a first resistor R1, a second resistor R2 and a third resistor R3. The SPDT S includes a SPDT first terminal, a SPDT second terminal, and a SPDT third terminal. The first resistor R1 is electrically connected between a live wire output terminal Lout and the SPDT first terminal. The SPDT second terminal is electrically connected to a Neutral wire output terminal Nout via the second resistor R2. The SPDT third terminal is electrically connected to the Neutral wire output terminal Nout via the third resistor R3. In one embodiment, a resistance of the first resistor R1 is 390 kilo ohm; a resistance of the second resistor R2 is 60 kilo ohm; a resistance of the third resistor R3 is 120 kilo ohm.

The rectification circuit 200 includes a diode D1 and a first capacitor C1. The diode D1 includes a diode anode and a diode cathode. The diode anode is electrically connected to the SPDT first terminal. The diode cathode is electrically connected to the Neutral wire output terminal Nout via the first capacitor C1. In one embodiment, a rectification coefficient of the diode D1 and the first capacitor C1 is 1.1.

The control circuit 300 includes an under voltage control circuit 301, an over voltage control circuit 302, and a thyristor VS. The under voltage control circuit 301 is configured to receive the DC voltage signal and does not output voltage signal when the AC voltage signal is under voltage. The over voltage control circuit 302 is configured to receive the DC voltage signal and turns on when the AC voltage signal is over voltage. The thyristor VS includes a thyristor control terminal, a thyristor first terminal, and a thyristor second terminal.

The under voltage control circuit 301 includes a bilateral diode D2 and a fourth resistor R4. The bilateral diode D2 includes a bilateral diode first terminal and a bilateral diode second terminal. The bilateral diode first terminal is electrically connected to the diode cathode. The bilateral diode second terminal is electrically connected to the thyristor control terminal via the fourth resistor R4. The thyristor first terminal is electrically connected to the Neutral wire output terminal Nout. In one embodiment, the turning on voltage of the bilateral diode D2 is 25V.

The over voltage control circuit 302 includes a transistor T, a second capacitor C2, a fifth resistor R5, and a sixth resistor R6. The transistor T includes a transistor base, a transistor emitter, and a transistor collector. The fifth resistor R5 and the second capacitor C2 are electrically connected in series between the diode cathode and the Neutral wire output terminal Nout. A connection point between the fifth resistor R5 and the second capacitor C2 is electrically connected to the transistor base. The sixth resistor R6 is electrically connected between the transistor base and the Neutral wire output terminal Nout. The transistor emitter is electrically connected to the Neutral wire output terminal Nout. The transistor collector is electrically connected to the thyristor control terminal. In one embodiment, a resistance of the fifth resistor R5 is 200 kilo ohm; a resistance of the sixth resistor R6 is 4 kilo ohm. The transistor T is an NPN type transistor.

The switch circuit 400 includes a winding unit M, a first switch K1, and a second K2. The electronic device 500 includes a live wire input terminal Lin and a Neutral wire input terminal Nin. The winding unit M is electrically connected between the thyristor VS second terminal and the live wire output terminal Lout. The first switch K1 is electrically connected between the live wire input terminal Lin and the live wire output terminal Lout. The second switch K2 is electrically connected between the Neutral wire input terminal NM and the Neutral wire output terminal Nout.

In use, when the AC voltage signal input in the electronic device 500 is 115V, the SPDT S is switched to electrically connect the SPDT first terminal to the SPDT third terminal. According to a national safety standard of the AC voltage signal, a safety scope of the 115V AC voltage signal is 110V to 135V. If the 115V AC voltage signal is under voltage, i.e. the 115V AC voltage signal is lower than 100V. The DC voltage signal output to the under voltage control circuit 301 is lower than the 25V turning on voltage of the bilateral diode D2. The thyristor control terminal does not have a DC voltage signal input and turns off. The thyristor first terminal is not electrically connected to the thyristor VS second terminal. The thyristor VS turns off the electronic connection from the live wire output terminal Lout to the winding unit M. The winding unit M is powered off. The first switch K1 and the second switch K2 turn off the electronic connection from the AC voltage signal to the electronic device 500. Thus, the electronic device 500 is protected when the 115V AC voltage signal is under voltage.

If the 115V AC voltage signal is over voltage, i.e. the 115V AC voltage signal is higher than 135V. The DC voltage signal output to the transistor base is higher than a 0.7V turning on voltage of the transistor T. The transistor T turns on. The thyristor control terminal receives a low level voltage DC voltage signal and turns off. The thyristor first terminal is not electrically connected to the thyristor second terminal. The thyristor VS turns off the electronic connection from the live wire output terminal Lout to the winding unit M. The winding unit M is powered off. The first switches K1 and the second switch K2 turn off the electronic connection from the AC voltage signal to the electronic device 500. Thus, the electronic device 500 is protected when the 115V AC voltage signal is over voltage.

When the AC voltage signal input in the electronic device 500 is 220V, the SPDT S is switched to electrically connect the SPDT first terminal to the SPDT second terminal. According to a national safety standard of the AC voltage signal, a safety scope of the 220V AC voltage signal is 180V to 240V. If the 220V AC voltage signal is under voltage, i.e. the 220V AC voltage signal is lower than 180V. The DC voltage signal output to the under voltage control circuit 301 is lower than the 25V turning on voltage of the bilateral diode D2. The thyristor control terminal does not have a DC voltage signal input and turns off. The thyristor first terminal is not electrically connected to the thyristor second terminal. The thyristor VS turns off the electronic connection from the live wire output terminal Lout to the winding unit M. The winding unit M is powered off. The first switch K1 and the second switch K2 turn off the electronic connection from the AC voltage signal to the electronic device 500. Thus the electronic device 500 is protected when the 220V AC voltage signal is under voltage.

If the 220V AC voltage signal is over voltage, i.e. the 220V AC voltage signal is higher than 240V. The DC voltage signal output to the transistor base is higher than a 0.7V turning on voltage of the transistor T. The transistor T turns on. The thyristor control terminal receives a low level voltage DC voltage signal and turns off. The thyristor first terminal is not electrically connected to the thyristor second terminal. The thyristor VS turns off the electronic connection from the live wire output terminal Lout to the winding unit M. The winding unit M is powered off. The first switch K1 and the second switch K2 turn off the electronic connection from the AC voltage signal to the electronic device 500. Thus, the electronic device 500 is protected when the 220V AC voltage signal is over voltage.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit comprising:
   a voltage regulating circuit configured to receive an AC voltage signal from a live wire output terminal and convert the AC voltage signal to a control signal;
   a control circuit configured to receive the control signal; and
   a switch circuit configured to be powered on and output the AC voltage signal when electrically connected to the AC voltage signal; wherein the control circuit is configured to turning on or turning off an electronic connection from the AC voltage signal to the switch circuit according to the control signal; wherein the control circuit comprises a under voltage control circuit and an over voltage control circuit; the under voltage control circuit is configured to receive the control signal and does not output voltage signal when the AC voltage signal is under voltage; and the over voltage control circuit is configured to receive the control signal and to turn on when the AC voltage signal is over voltage.

2. The power supply circuit of claim 1, wherein the voltage regulating circuit comprises single-pole double-throw (SPDT), a first resistor, a second resistor and a third resistor; the SPDT comprises a SPDT first terminal, a SPDT second terminal, and a SPDT third terminal; the first resistor is electrically connected between the live wire output terminal and the SPDT first terminal; the SPDT second terminal is electrically connected to a Neutral wire output terminal via the second resistor; and the SPDT third terminal is electrically connected to the Neutral wire output terminal via the third resistor.

3. The power supply circuit of claim 2, further comprising a rectification circuit configured to receive the control signal and convert the control signal to a DC voltage signal as the control signal.

4. The power supply circuit of claim 3, wherein the rectification circuit comprises a diode and a first capacitor; the diode comprises a diode anode and a diode cathode; the diode anode is electrically connected to the SPDT first terminal; and the diode cathode is electrically connected to the Neutral wire output terminal via the first capacitor.

5. The power supply circuit of claim 4, wherein the control circuit further comprises a thyristor; the thyristor comprises a thyristor control terminal, a thyristor first terminal, and a thyristor second terminal; the under voltage control circuit comprises a bilateral diode and a fourth resistor; the bilateral diode comprises a bilateral diode first terminal and a bilateral diode second terminal; the bilateral diode first terminal is electrically connected to the diode cathode; the bilateral diode second terminal is electrically connected to the thyristor control terminal via the fourth resistor; and the thyristor first terminal is electrically connected to the Neutral wire output terminal.

6. The power supply circuit of claim 5, wherein the over voltage control circuit comprises a transistor, a second capacitor, a fifth resistor, and a sixth resistor; the transistor comprises a transistor base, a transistor emitter, and a transistor collector; the fifth resistor and the second capacitor are electrically connected in series between the diode cathode and the Neutral wire output terminal; a connection point between the fifth resistor and the second capacitor is electrically connected to the transistor base; the sixth resistor is electrically connected between the transistor base and the Neutral wire output terminal; the transistor emitter is electrically connected to the Neutral wire output terminal; and the transistor collector is electrically connected to the thyristor control terminal.

7. The power supply circuit of claim 5, wherein the switch circuit is configured to output the AC voltage signal to an electronic device when powered on; the switch circuit comprises a winding unit, a first switch, and a second switch; the electronic device comprises a live wire input terminal and a Neutral wire input terminal; the winding unit is electrically connected between the thyristor second terminal and the live wire output terminal; the first switch is electrically connected between the live wire input terminal and the live wire output terminal; and the second switch is electrically connected between the Neutral wire input terminal and the Neutral wire output terminal.

8. A power supply circuit comprising:
a voltage regulating circuit configured to receive an AC voltage signal from a live wire output terminal and convert the AC voltage signal to a control signal;
a control circuit configured to receive the control signal; and
a switch circuit configured to be powered on and output the AC voltage signal when electrically connected to the AC voltage signal; wherein when the AC voltage signal is normal, the control circuit turns on to electrically connected the AC voltage signal to the switch circuit, and the switch circuit is powered on to output the AC voltage signal; when the AC voltage signal is over voltage or under voltage, the control circuit turns off to turn off an electronic connection from the AC voltage signal to the switch circuit, and the switch circuit is powered off and does not output the AC voltage signal; wherein the voltage regulating circuit comprises single-pole double-throw (SPDT), a first resistor, a second resistor and a third resistor; the SPDT comprises a SPDT first terminal, a SPDT second terminal, and a SPDT third terminal; the first resistor is electrically connected between the live wire output terminal and the SPDT first terminal; the SPDT second terminal is electrically connected to a Neutral wire output terminal via the second resistor; and the SPDT third terminal is electrically connected to the Neutral wire output terminal via the third resistor.

9. The power supply circuit of claim 8, wherein the control circuit comprises a under voltage control circuit; and the under voltage control circuit is configured to receive the control signal and does not output voltage signal when the AC voltage signal is under voltage.

10. The power supply circuit of claim 8, wherein the control circuit further comprises an over voltage control circuit; and the over voltage control circuit is configured to receive the control signal and to turn on when the AC voltage signal is over voltage.

11. The power supply circuit of claim 8, further comprising a rectification circuit configured to receive the control signal and convert the control signal to a DC voltage signal as the control signal.

12. The power supply circuit of claim 11, wherein the rectification circuit comprises a diode and a first capacitor; the diode comprises a diode anode and a diode cathode; the diode anode is electrically connected to the SPDT first terminal; and the diode cathode is electrically connected to the Neutral wire output terminal via the first capacitor.

13. The power supply circuit of claim 12, wherein the control circuit further comprises a thyristor; the thyristor comprises a thyristor control terminal, a thyristor first terminal, and a thyristor second terminal; the under voltage control circuit comprises a bilateral diode and a fourth resistor; the bilateral diode comprises a bilateral diode first terminal and a bilateral diode second terminal; the bilateral diode first terminal is electrically connected to the diode cathode; the bilateral diode second terminal is electrically connected to the thyristor control terminal via the fourth resistor; and the thyristor first terminal is electrically connected to the Neutral wire output terminal.

14. The power supply circuit of claim 13, wherein the over voltage control circuit comprises a transistor, a second capacitor, a fifth resistor, and a sixth resistor; the transistor comprises a transistor base, a transistor emitter, and a transistor collector; the fifth resistor and the second capacitor are electrically connected in series between the diode cathode and the Neutral wire output terminal; a connection point between the fifth resistor and the second capacitor is electrically connected to the transistor base; the sixth resistor is electrically connected between the transistor base and the Neutral wire output terminal; the transistor emitter is electrically connected to the Neutral wire output terminal; and the transistor collector is electrically connected to the thyristor control terminal.

15. The power supply circuit of claim 13, wherein the switch circuit is configured to output the AC voltage signal to an electronic device when powered on; the switch circuit comprises a winding unit, a first switch, and a second switch; the electronic device comprises a live wire input terminal and a Neutral wire input terminal; the winding unit is electrically connected between the thyristor second terminal and the live wire output terminal; the first switch is electrically connected between the live wire input terminal and the live wire output terminal; and the second switch is electrically connected between the Neutral wire input terminal and the Neutral wire output terminal.

* * * * *